H. MACKEY.
COMBINED DRILL AND THREAD CUTTER.
APPLICATION FILED SEPT. 23, 1911.
1,050,152.
Patented Jan. 14, 1913.
3 SHEETS—SHEET 1.
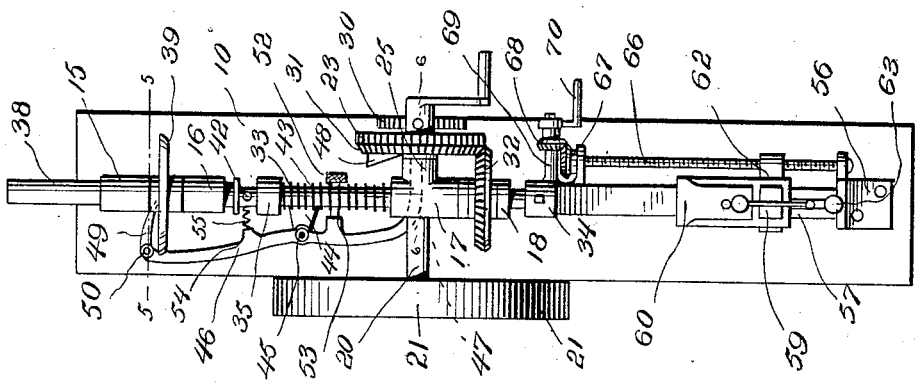
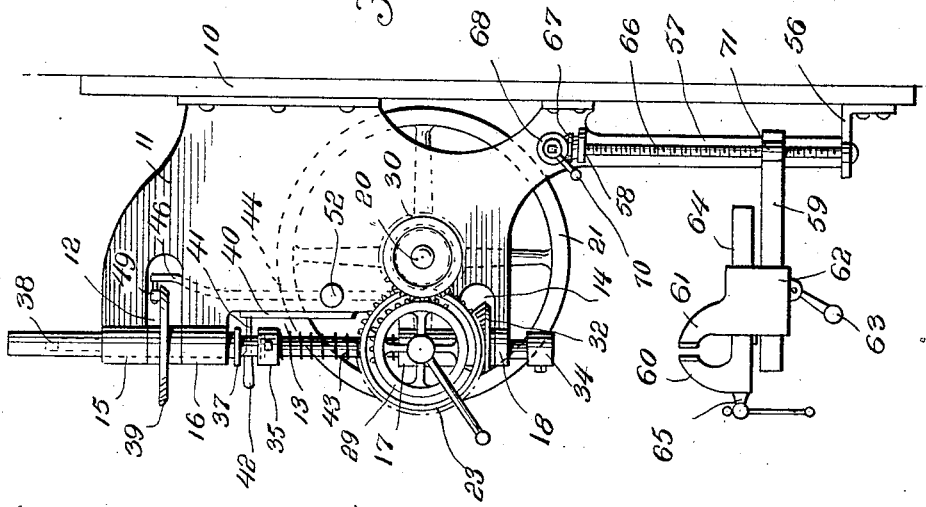
Witnesses
William R. Smith.
Inventor
Hilliard Mackey.
By Victor J. Evans
Attorney

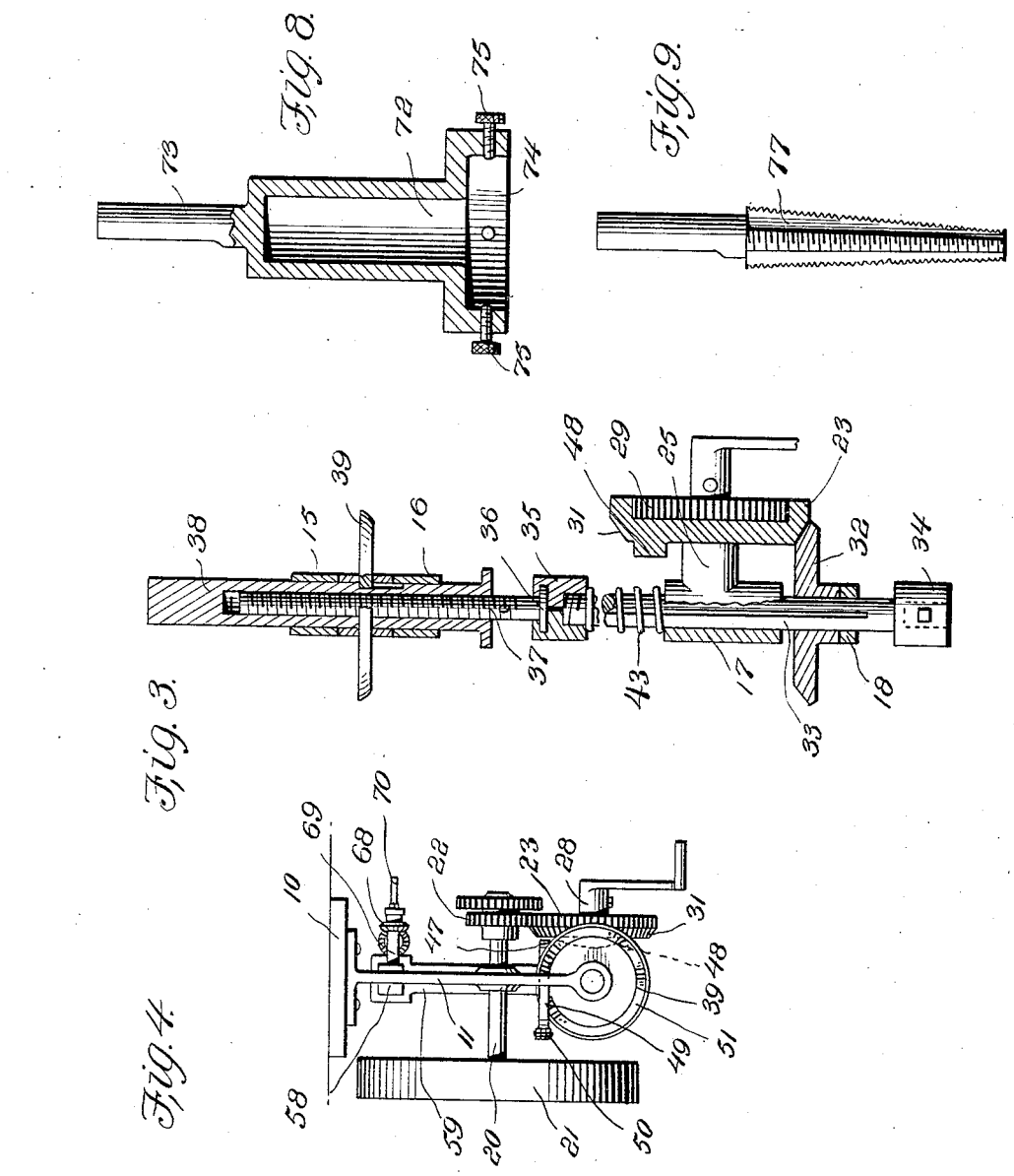

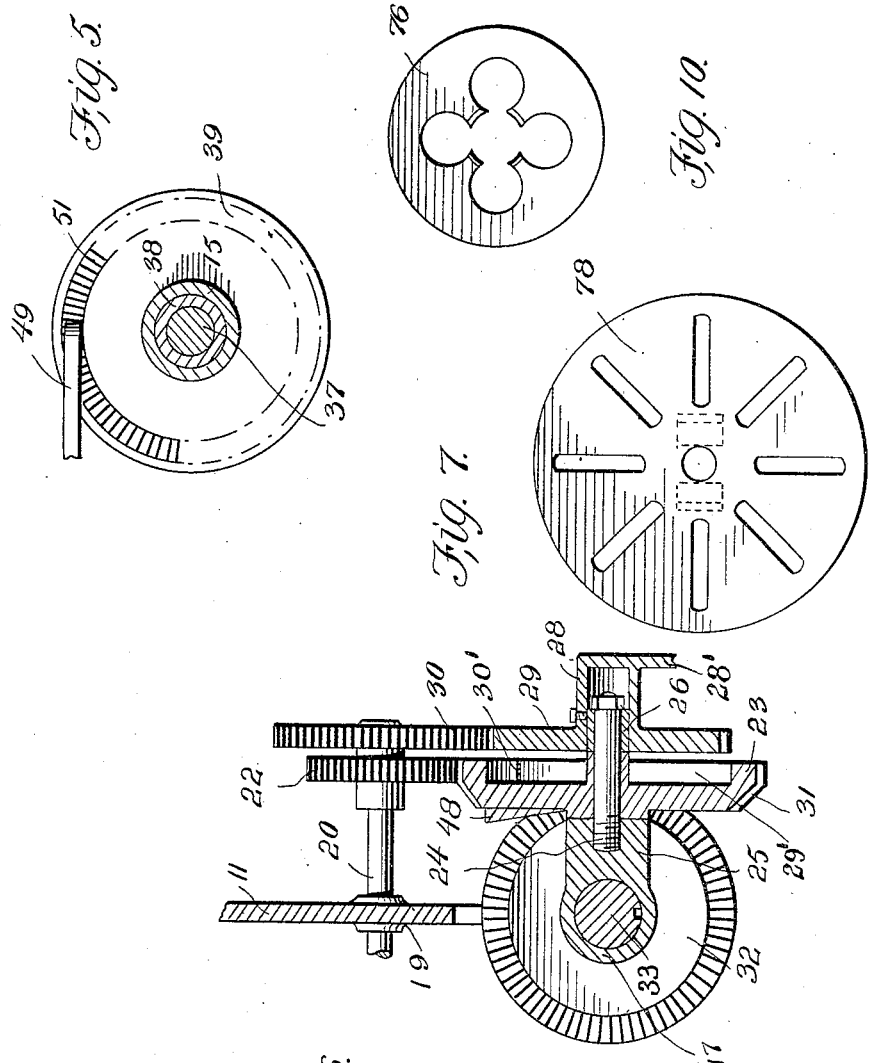

UNITED STATES PATENT OFFICE.

HILLIARD MACKEY, OF LAMAR, MISSISSIPPI.

COMBINED DRILL AND THREAD-CUTTER.

1,050,152.  Specification of Letters Patent.  Patented Jan. 14, 1913.

Application filed September 23, 1911. Serial No. 650,893.

*To all whom it may concern:*

Be it known that I, HILLIARD MACKEY, a citizen of the United States, residing at Lamar, in the county of Benton and State of Mississippi, have invented new and useful Improvements in Combined Drills and Thread-Cutters, of which the following is a specification.

The invention relates to a combination drill and thread cutter and more particularly to the class of self-feeding drills and thread cutting machines.

The primary object of the invention is the provision of a machine in which a vise for centering the work is capable of adjustment toward and away from the drill or operating tool the latter being automatically fed for threading and tapping metal bolts, pins and the like, and which may also be used as a nutting tool.

Another object of the invention is the provision of a machine of this character in which the drill or operating tool may be driven at different speeds.

A further object of the invention is the provision of a machine of this character, which is simple in construction, readily and easily operated, thoroughly reliable and efficient in its operation and inexpensive in manufacture.

With these and other objects in view the invention consists in the construction, combination, and arrangement of parts, as will be hereinafter more fully described, illustrated in the accompanying drawings and pointed out in the claim hereunto appended.

In the drawings: Figure 1 is a side elevation of a machine constructed in accordance with the invention. Fig. 2 is a front elevation thereof. Fig. 3 is a fragmentary, vertical, longitudinal sectional view through the machine. Fig. 4 is a top plan view. Fig. 5 is a sectional view on the line 5—5 of Fig. 2. Fig. 6 is a transverse, sectional view through the changeable gearing for driving the machine taken on the line 6—6 of Fig. 2. Fig. 7 is a plan view of a work table for attachment in the vise. Fig. 8 is a vertical, longitudinal, sectional view through a tool holder. Fig. 9 is a side elevation of a tapping tool. Fig. 10 is a plan view of a thread cutting die.

Similar reference characters indicate corresponding parts throughout the several views in the drawings.

Referring to the drawings by numerals the machine comprises a base or support 10, same adapted to be secured in any suitable manner to a vertical wall or other stationary part and has fixed thereto a bracket 11 which is cut away at its free edge to provide gaps or recesses 12, 13 and 14 respectively, the said free edge of the bracket being formed with independent sleeves 15, 16, 17 and 18 respectively which are spaced apart by the recesses in the bracket. Formed in the bracket 11 rearwardly of the sleeve 17 is a bearing 19 in which is journaled a driving shaft 20 on one end of which is fixed a fly or belt wheel 21, the same being disposed at one side of the bracket while on the opposite end of the shaft are fixed small and large gears 22 and 30 respectively, the gear 22 being engaged with a gear 23 loosely journaled upon a stud spindle 24 mounted in an off-set bearing 25 formed on the sleeve 17, while the gear 30 is adapted to mesh with a gear 29 formed with a hollow hub 28 telescoped upon a tubular extension 26 formed centrally on the gear 23, the hub 28 being loose upon the tubular extension 26 so that the gear 29 may be revolved thereon when meshing with the gear 30. The hollow hub 28 of the gear 29 is formed with a hand crank 28' whereby the machine may be manually operated. The gear 23 in its outer face is formed with a hollow 29' of a size corresponding to the gear 29 for receiving the same when the hub 28 is slid inwardly on the extension 26 and projecting into this hollow 29' is a locking lug 30' adapted to mesh with the teeth on the gear 29, thereby locking the latter to the gear 23 after said gear 29 is disengaged from the gear 30, so that the gears 22 and 23 will operate together thereby driving the machine at a different speed than when the gears 29 and 30 are meshing with each other.

The gear 23 is formed with beveled crown teeth 31 meshing with a beveled gear 32 splined or otherwise keyed to a drill or other tool shaft 33 which is slidably and rotatably mounted in the sleeves 17 and 18 on the bracket, it being evident that by reason of the gear 32 being splined or keyed to the said shaft 33 the latter may freely slide through the gear for the longitudinal adjustment thereof in the sleeves 17 and 18 of the bracket. The outer end of the shaft 33 is formed with a chuck 34 in which is adapted to be engaged a drill or a tool holder presently described.

Mounted on the inner end of the shaft 33 is a swivel nut 35, in which is loosely engaged the head 36 of a feed screw 37, the same being threaded in a rotatable shaft or spindle 38 journaled within the sleeves 15 and 16, the said shaft or spindle 38 being provided with a feed wheel 39 keyed or otherwise secured thereto, and which is disposed within the recess 12 between the sleeves 15 and 16. Thus it will be seen that upon rotation of the feed wheel 39, the shaft 38 will be rotated, so that the feed screw 37 will telescope within the same or move outwardly thereof for the advancement of the drill or other tool shaft 33, the pinion 32 upon the latter shaft being located within the recess 14, and in this manner is prevented from displacement laterally upon the drill or tool shaft 33, as said pinion abuts against the sleeves 17 and 18 disposed at opposite sides thereof.

Formed in the vertical wall of the recess 13 is a vertical guide groove 40, in which is engaged the inner end of a holding pin 41 which is passed through the feed screw 37, the outer end of the said pin being formed with a hand grip 42; thus, in this manner it will be seen that the pin 41 engaged in the groove 40 will prevent the rotation of the feed screw 37 during the longitudinal displacement thereof.

Surrounding the drill or other tool shaft 33 is a coiled expansion spring 43, one end of which has its bearing against the swivel nut 35, while its opposite end has its bearing against the adjacent end of the sleeve 17, the spring being designed to assist in the lifting of the drill or other tool shaft 33, when the drill or tool carried thereby is being retracted from the work.

Formed on the bracket and projecting laterally therefrom at one side thereof, is a bearing ear 44, to which is pivoted, as at 45, a rocking lever 46, the lower end of which is formed with an inturned nose 47 adapted to contact with and travel over a waved cam swell 48 formed concentrically about the said axle 24 on one side of the cog gear 23, the upper end of the lever 46 being provided with a gravitating ratchet pawl 49 which is connected thereto by means of a pivot 50, the pawl being adapted to engage ratchet teeth 51 formed on the upper face of the feed wheel, so that on the rotation of the cog gear 23, the lever 46 will be rocked, thereby causing the feed wheel to rotate for actuating the feed screw 37, thus advancing the drill or other tool carried by the drill or other tool shaft 33 toward the work to be operated upon.

Threaded in the bracket 11 is an adjustable winged screw 52 which is arranged in alinement with a lug 53 formed on the rocking lever 46, thus limiting the rocking movement of the said lever 46 in one direction, it being understood that by adjustment of the winged screw 52, the throw of the lever in one direction may be increased or decreased, as desired. Spaced from the upper end of the lever and formed thereon is a bearing lug 54, with which is engaged one end of an expansion spring 55, the opposite end of which has its bearing against the bracket 11, the spring 55 being designed to positively hold the nose 47 of the lever 46 in contact with the cam swell for the proper actuation of the feed wheel 39 which in turn operates the drill or other tool shaft 33 of the machine.

Fixed to the base 10, at a point below the bracket 11, is a bearing 56, in which is engaged one end of a vertical guide post 57, the opposite end of which is engaged in a socket 58 formed in the bracket 11, and slidably connected with this post 57 is a supporting arm 59 carrying a centering vise, presently described.

The centering vise comprises a pair of coacting jaws or clamping members 60 and 61, respectively, the jaw 61 being formed with a collar 62 surrounding the supporting arm 39 and carries a locking lever 63 which is adapted to engage the supporting arm for locking the collar 62 in adjusted position upon the arm. The jaw 60 is formed with a shank 64 slidably engaged in the jaw 61, the shank being provided with the usual adjusting screw 65, whereby the jaws may be brought together or opened, as desired, for the clamping and centering of work to be operated upon by the drill or other tool.

Journaled in the bracket 11 and the bearing 56 spaced from and in parallel relation to the guide post 57, is a feed screw 66, the upper end of which is provided with a pinion 67 suitably fixed thereto and meshing with a gear 68 journaled upon a stud spindle 69 fixed in the bracket 11 at right angles to the feed screw, the gear 68 being provided with a hand crank 70, so that upon the turning of the latter the screw will be rotated.

Projecting laterally from the collar 62 on the jaw 61 is an internally threaded lug 71 which engages the feed screw 66, whereby on the rotation of the latter, the vise will be raised and lowered upon the post 57, thereby bringing the work into proper position to be operated upon by the drill or other tool.

Adapted for detachable connection in the chuck 34 on the drill shaft 33 is a tool holder, comprising a hollow cylindrical body 72, the same being formed at one end with a stem 73 which is adapted to be engaged in the chuck 34 and held fast therein, while the opposite end of the body is formed with a dished circular head 74, in the side wall of which are threaded milled binding screws 75, whereby a screw cutting die 76 may be secured therein, it being understood that varying sized thread cutting dies may be employed.

In lieu of the tool holder, a tapping tool 77 may be secured in the chuck 34 for the cutting of threads in a nut or other part.

Should it be desired to operate upon flat work, there is provided a suitable work supporting table 78 which is of the ordinary well-known construction, and is adapted to be inserted in the vise, whereby work may be held upon the table to be operated upon by a drill or other tool.

From the foregoing, taken in connection with the accompanying drawings, it is thought that the construction and operation of the invention will be readily understood, without requiring a more extended explanation.

What is claimed is:—

A machine of the class described, comprising a support having spaced alining sleeves, a tool supporting shaft rotatably mounted in a pair of said sleeves, a pinion fixed to said shaft, a driving shaft journaled in said support, small and large gears fixed to said driving shaft, a bearing formed on one of said sleeves, a stud shaft mounted in said bearing, a beveled gear journaled on said stud shaft and meshing with said pinion and having crown teeth engaging the smaller gear of the driving shaft, the said beveled gear being provided with a recess in its outer face, a hub projecting centrally and outwardly from the recess, a gear slidable on to said hub and movable into and out of the recess for disengagement from and engagement with the larger gear on the driving shaft and mechanism operated upon by the beveled gear for feeding the tool supporting shaft in one direction.

In testimony whereof I affix my signature in presence of two witnesses.

HILLIARD MACKEY.

Witnesses:
F. D. HANDLE,
J. O. TYSON.

Copies of this patent may be obtained for five cents each, by addressing the "Commissioner of Patents, Washington, D. C."